J. A. SALADIN.
MALTING OF GRAIN.
No. 192,292. Patented June 19, 1877.
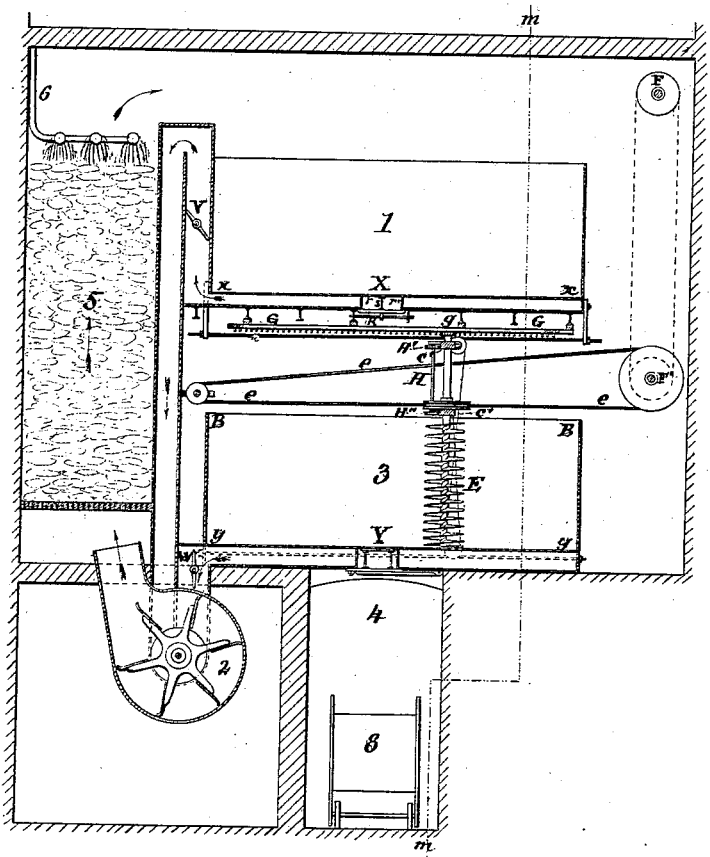

UNITED STATES PATENT OFFICE.

JULES ALPHONSE SALADIN, OF NANCY, FRANCE.

IMPROVEMENT IN MALTING OF GRAIN.

Specification forming part of Letters Patent No. 192,292, dated June 19, 1877; application filed June 5, 1877.

*To all whom it may concern:*

Be it known that I, JULES ALPHONSE SALADIN, of Nancy, in the Department of Meurth and Moselle, France, have invented certain new and useful Improvements in the Malting of Grain, and that the following is a full, clear, and exact description of the same, reference being had to the accompanying drawing, making part of this specification.

The object of my invention is the malting of grain, barley for breweries, or any other grains, and consists in causing grain to germinate in very thick layers (one meter or more) and in ventilating and stirring it mechanically, so as to obtain a great saving in manual labor over the old process, although producing with great regularity, and throughout the whole year, a malt of superior quality.

The apparatus and means used are as follows: First, a soaking-tub; second, a germinating-box; third, damp and cool ventilation; fourth, a stirring apparatus; fifth, a mode of carrying or transferring the grain from one apparatus to the other.

The form of the apparatus shown is suitable to malt from 2,000 to 2,500 pounds of barley, and in the drawings similar letters designate similar parts.

Figures 1 and 2 represent, respectively, in longitudinal and tranverse sections, the improved combination and arrangement of apparatus employed by me to produce the malting of grains, in accordance with my invention.

The barley is brought from the granary in the ordinary manner into the soaking-tub 1 in suitable quantity to form a layer of one meter or more in thickness.

Water to soak it is brought from above through a pipe, $p$, controlled by a cock, and it is removed from below through the pipe $p'$ to change and renew the water, as usual.

After a suitable time has elapsed, the grain being well soaked, the water is drawn for the last time, the valve V is then opened, so that the exhaust-fan 2 may draw through its eye the air which, proceeding in the direction of the arrows marked in the drawings, passes through the whole thickness of the layer of soaked grain and allows it to germinate.

Air and water may be admitted successively, so as to produce alternate dampening and drying.

A stirring apparatus may be placed and used in the soaking-tub, but in general it is not needed, as at that early period of the operation vegetation is not sufficiently active to necessitate its use. As before mentioned, in the tub 1 the grain is soaked with water and aerated by the air exhausted and drawn through the perforations of the sheet-iron bottom $x$ upon which the grain rests.

The germination of the grain constitutes a second period of the operation, requiring the use of mechanical or manual stirrers to allow the grain to swell and start its sprouts without becoming agglomerated or entangled while subjected to currents of air. I accomplish this operation preferably in another tank, 3, which I call the germinating-box.

It is clear that if some stirrers were placed in the tub 1, the two operations, viz., aerated soaking and germination could be accomplished in succession, but I found it was more practical and saving of room to have two tubs, located one above the other, as shown in the drawings, and in this case it is only necessary to let the grain that has been soaked and aerated run down into the box 3, by opening a trap-door, X, placed in the center of the bottom of the tub 1.

This tub 1 is shown as made of sheet-iron, but it could as well be made of wood, stone or any other suitable material; it is stationary, and can rest either upon columns or cross-beams; it is shown as rectangular, but it may be made cylindrical.

The small holes in the perforated bottom $x$ are generally made round, of about one-eighth of an inch in diameter, but they can be larger, if larger grains are to be operated upon.

As shown in the drawings, the trap-door X is composed of two shutters of perforated sheet-iron, $r\ r$, sustained by two small columns, $s\ s$, resting upon the register R.

To let the grain fall through the openings, the register R is drawn back by means of a pinion, $t$, operating upon a rack, and the shutters $r\ r$ being without support, revolve around their hinges and fall to the position marked in dotted lines, Fig. 2, and the grain passes through the opening.

The soaked and aerated grain is gathered in the box 3 in a layer of more than one meter, the top of which is then leveled, and as it rests upon a sheet-iron bottom perforated in the same manner as the tub, the grain is aerated by opening the valve W, allowing the atmospheric air to pass through the grain from top to bottom, then through the perforated bottom Y to the exhaust-fan through the passage indicated by the arrow in the drawing.

The grain can be stirred as soon as placed in the box, but it is not really necessary to begin until about four hours after it has been placed there.

The stirring operation may be effected in any desired manner, but I prefer to do it mechanically. The box 3 is indicated as made of sheet-iron; but it can be made of cast-iron, wood, stone, or any desired material. It is provided with a trap-door, Y, like the trap X of the tub 1, to allow the grain to be emptied in receivers placed under it in the passage 4. The air I cause to pass through the grain is damp and cool, and it is so obtained by forcing the air that has been drawn through the tubs 1 and 3 into a reservoir, 5, filled with a spongy mass kept constantly wet by allowing cold water to fall in abundance from a pipe, 6. The reservoir, in which the air forced by the fan is cooled and dampened, may be made of any material, and of any form and size desirable; and the spongy mass may be composed of pebbles, coke, broken bricks, and similar materials. It may also be made of sponge, cork-cuttings, peat, tan, bark of different kinds, fibrous material, or cloth of any kind, wire-gauze, leather, hair, horn, cuttings, or clippings or flocks; also moss, straw, and shavings.

It is necessary that these materials should be prepared so as not to deteriorate in contact with water. The main object is to present a large surface of contact between the falling water and the ascending air, without requiring too much pressure to impel it.

The water used should indicate 10° centigrade, and even less, so as to cool down the air passing through the saturator 5 to a temperature not exceeding 12° centigrade. It is the same air that circulates through the whole room, indicated as masonry in the drawing; and it will be understood that any kind of fan-blower will answer in place of the one shown at 2, so long as the air exhausted through the tubs 1 and 3 is the same that has been heated by contact with the grain and forced to cool it through the saturating reservoir 5. But this air can also be passed through the grain and through the saturator upwardly from bottom to top, or laterally, or even horizontally.

One exhaust-fan and one saturator may be used for a series of tubs or tanks placed in the same room, or one may be used for each tub and tank of the series.

When the grain has sprouted and thrown out its roots, and when the time has come to arrest the germination, then the exhaust or aeration is stopped by closing the valve W and by opening the trap-door Y, so as to let the green malt fall into a small wagon, 8, placed in the passage 4, that has no communication with the room containing the tubs and tanks, so that the issue of the green malt shall cause no loss of the air prepared as above described.

The small wagons may be replaced by an endless belt, with or without buckets, or in any other manner, so as to carry the green malt as promptly as possible to the malt-kiln.

I have shown in Fig. 3 a modified tank, A, of sheet-iron, large enough to hold the charge of grain it is intended to soak, and capable of supporting the external atmospheric pressure.

With this apparatus I can soak grain in vacuo much more rapidly than when I use the tub 1, (Figs. 1 and 2,) which requires always from fifty to eighty-four hours time, and even more.

In the apparatus shown in Fig. 3 the grain is introduced through the opening B. Ordinary water, or water that has been previously boiled or purified, is introduced, under heavy pressure, through the bottom of the apparatus at T, thus stirring the grain and expelling the air that surrounds it. It will take from three to six hours to soak the grain; and when the dampness has penetrated it and begins to soften the grain, the opening B is closed by a plate, being bolted down, and the internal air is exhausted by means of a pump, P, operated by hand or mechanically.

The vacuum is indicated by the gage M, and when it is sufficient the whole is allowed to rest for one to six hours, according to the nature of the grain, care being taken that the vacuum be maintained my means of the air-pump. Air is then admitted slowly through the cock R, and the water in which the grain has been soaking is withdrawn through the pipe S, and the grain can be immediately withdrawn into the germinating-box through the trap-door X. The vacuum is sufficient to remove all the air from the grain, and to replace it by water, which thus penetrates and soaks it more completely and more readily than by the ordinary process.

Figs. 1 and 2 indicate the arrangement of a stirring apparatus with a single vertical helix or screw, E, which is carried successively to every portion of the box 3, following the dotted lines indicated on a reduced scale, and in plan view in Fig. 4. The two horizontal edges, B B, of the box 3 are planed smooth, to form two rails parallel to the perforated sheet-iron bottom. Upon these rails the carriage c c slides, either by means of shoes or rollers b b, Fig. 5.

This carriage being placed perpendicularly to the length of the box is guided by the pulleys D D D D, placed at each extremity, and upon which the chains or cords d d d d, Fig. 5, pass to retain perfect parallelism in all positions. A helix or screw, E, carried by the lower portions of the axle E' is buried in the grain, and while revolving elevates it constantly.

This helix can be made of sheet-iron, tin, copper, zinc, brass, &c., or cast-iron, cast-zinc, and even wood, according to circumstances.

The axle can be solid or it can be hollow to convey to the bottom of the grain any kind of liquid or gas. The helix may be made hollow out of pipes bent spirally and perforated, so as to allow of the introduction into the mass of grain either a liquid or a gas, as may be desired.

The shaft E' of the helix is supported in grooved bearings C' C' of the carriage C, and follows it in every direction. The lower end of the helix extends to within a quarter of an inch, or thereabout, of the perforated bottom, so as not to touch it. A pulley, E'', operated by the belt e, is rotated from the pulley F', and the latter from the pulley F, so that the helix is rotated continuously in the same direction.

The upper end of the shaft E' of the helix carries a pinion, g, which gears with a rack, G, located above the box or attached to the tub above. This rack G, with its two ways g' g'', follows a sinous path, as shown in Fig. 4. The upper part of the pinion is engaged in one of the paths, and follows it from one end to the other, and then returns in the same way through the other side.

The pinion g in revolving follows the longitudinal rack, Fig. 4, and draws along with it the carriage and the screw. At the end of the box the rack G takes a lateral direction at G', the pinion following it advances the helix transversely near the end of the box, then after a short run about equal in length to the diameter of the helix, the rack takes again the longitudinal direction G'', and continues in the same manner until the screw has passed over the whole surface of the box, stirring the grain everywhere upon its passage without leaving a grain unmoved, thus dividing and continuously stirring the mass of grain to permit air to circulate through it.

While following the longitudinal tracks the carriage is kept vertical and parallel by means of chains or belts d d, and while following the transverse tracks, the shaft of the helix is kept vertical by a small-shaft, H, the two pinions H' and H'' of which mesh with the two racks h and h', attached to the cross-pieces of the carriage itself, the shaft H being carried by the supports C C' of the helix, which supports can slide along the cross-pieces of the carriage C. As the helix is not permitted to touch the perforated bottom, and as the grain laying upon the bottom cannot be reached by the screw, I have attached to the bottom of the screw a small but rather heavy brush B, (shown in Figs. 6 and 7,) in elevation and plan having the form of an epicycloid, and hinged loosely enough to allow it to follow all over the surface of the bottom, and by virtue of its eccentric form throws the grain not reached by the helix into heaps, which are then reached and acted upon by the screw. As the screw is cylindrical and cannot get at the corners of the box, I have filled the corners so as to make them correspondingly cylindrical, as at a' a', Fig. 4, and also at a'' a'', the filling, consisting of sheet-iron, cast-iron, wood, cement, &c., is formed so that every grain is stirred by the screw.

The pitch of the screw should be short enough to raise the grain gently without any shock or heavy pressure. The edge of the screw should be blunt, and thick enough not to bruise the sprouts of the grain. To facilitate its introduction into the mass the edge may be indented or corrugated, as shown in Figs. 6 and 7. The speed of revolution of the screw, its diameter, and pitch should be regulated according to the mode, the force, and the speed that it is desired to stir the different kinds of grains that may be malted. The periphery of the screw may be continuous, or divided, so that each portion forms an inclined plane in the direction of the spiral.

The stirring of the grain may be effected continuously or alternately with periods of rest, according to the kind of grain and progress of the germination, and as may be judged best by experience.

A number of stirring-screws may be attached to the carriage, so as to occupy the whole width of the box, in which case it will only be necessary for the carriage to proceed forward and backward while the screws are rotating.

Having thus described my said invention, and the manner in which the same is or may be carried into effect, what I claim, and desire to secure by Letters Patent, is—

1. The general arrangement herein shown and described, of soaking and germinating tubs and discharge-passage for operation, as set forth.

2. The process of malting, substantially as herein shown and described, the same being divided into two operations, which are effected in separate receptacles placed one above the other.

3. In combination with the malting apparatus, as described, of mechanical stirrers, operating substantially as shown and set forth.

4. In the process of malting, herein described, agitating the mass of grain while subjected to a blast of cold and moist air.

In testimony whereof I have signed my name to this specification before two subscribing witnesses.

J. A. SALADIN.

Witnesses:
EMILE BARRAULT,
AUG. VINCK.